US009183500B2

(12) United States Patent  (10) Patent No.: US 9,183,500 B2
Lamb et al.  (45) Date of Patent: Nov. 10, 2015

(54) LOGIC MODEL FOR MEDIA CUSTOMIZATION WITH ITEM ASSOCIATION

(71) Applicant: The Shadow Gang, LLC, Oak Park, IL (US)

(72) Inventors: Joshua Lamb, Oak Park, IL (US); Alexander Lemay, Chicago, IL (US); Steven E. Harshbarger, Corte Madera, CA (US)

(73) Assignee: Multipop LLC, Oak Park, IL (US)

( * ) Notice: Subject to any disclaimer, the term of this patent is extended or adjusted under 35 U.S.C. 154(b) by 281 days.

(21) Appl. No.: 14/045,770

(22) Filed: Oct. 3, 2013

(65) Prior Publication Data

US 2014/0136469 A1 May 15, 2014

Related U.S. Application Data

(63) Continuation-in-part of application No. 13/653,398, filed on Oct. 16, 2012, now abandoned.

(51) Int. Cl.
| | |
|---|---|
| *G06F 17/00* | (2006.01) |
| *G06N 7/00* | (2006.01) |
| *G06N 7/08* | (2006.01) |
| *G06N 5/02* | (2006.01) |
| *G06Q 30/02* | (2012.01) |
| *G11B 27/11* | (2006.01) |

(52) U.S. Cl.
CPC .............. *G06N 5/02* (2013.01); *G06Q 30/0241* (2013.01); *G11B 27/11* (2013.01)

(58) Field of Classification Search
USPC .......................................................... 706/59
See application file for complete search history.

(56) References Cited

U.S. PATENT DOCUMENTS

| | | | | |
|---|---|---|---|---|
| 5,694,334 | A * | 12/1997 | Donahue | H04L 29/06 348/E7.071 |
| 7,433,580 | B1 * | 10/2008 | Terashita | G11B 27/002 386/231 |
| 7,664,262 | B2 * | 2/2010 | Haruki | G11B 20/00086 380/200 |

(Continued)

OTHER PUBLICATIONS

Ground control station avionics software development in ANKA UAV Kayayurt, B.; Yayla, I.; Yapici, A.; Kucukoguz, C. Digital Avionics Systems Conference (DASC), 2011 IEEE/AIAA 30th Year: 2011 pp. 5B6-1-5B6-7, DOI: 10.1109/DASC.2011.6096079 Referenced in: IEEE Conference Publications.*

(Continued)

*Primary Examiner* — Michael B Holmes
(74) *Attorney, Agent, or Firm* — Patent Ingenuity, P.C.; Samuel K. Simpson

(57) ABSTRACT

A computing device receives a plurality of media files. Further, the computing device associates an item with a media file from the plurality of media files according to an association. The item is displayed during display of the media file. The association has a predetermined playback time during playback of the media file at which item data is displayed in addition to the display of the media file. In addition, the computing device generates a hierarchical logic model for media playback. The hierarchical logic model organizes the plurality of media files for playback into a hierarchy according to a predetermined set of conditions. A set of code is provided to a media player for media playback based upon the logic model and the association between the item and the media file.

19 Claims, 14 Drawing Sheets

(56) References Cited

U.S. PATENT DOCUMENTS

| | | | | |
|---|---|---|---|---|
| 7,962,005 | B2* | 6/2011 | Terada | G11B 27/034 386/239 |
| 8,031,868 | B2* | 10/2011 | Isozaki | G11B 20/00086 380/200 |
| 8,498,514 | B2* | 7/2013 | Terashita | G11B 27/002 386/239 |
| 8,570,237 | B2* | 10/2013 | Brown | H01Q 5/42 343/876 |
| 8,571,994 | B2* | 10/2013 | Robert | G06F 21/10 705/51 |
| 2014/0108329 | A1* | 4/2014 | Lamb | G06N 5/02 706/59 |
| 2014/0136469 | A1* | 5/2014 | Lamb | G06N 5/02 706/59 |
| 2014/0337259 | A1* | 11/2014 | Lamb | G06N 5/025 706/14 |
| 2014/0370777 | A1* | 12/2014 | Minassian | A63H 33/003 446/102 |

OTHER PUBLICATIONS

Segmentation Analysis for Effective Usage of Network Resources in Video Streaming Thyagharajan, K.K.; Ramachandran, V. Conference on Computational Intelligence and Multimedia Applications, 2007. International Conference on Year: 2007, vol. 4 pp. 383-387, DOI: 10.1109/ICCIMA.2007.43 Referenced in: IEEE Conference Publications.*

Scalable On-Demand Streaming of Nonlinear Media Yanping Zhao; Eager, D.L.; Vernon, M.K. Networking, IEEE/ACM Transactions on Year: 2007, vol. 15, Issue: 5 pp. 1149-1162, DOI: 10.1109/TNET.2007.896534 Referenced in: IEEE Journals & Magazines.*

* cited by examiner

LOGIC MODEL FOR MEDIA CUSTOMIZATION WITH ITEM ASSOCIATION

RELATED APPLICATIONS

This patent application is a Continuation-In-Part patent application of U.S. patent application Ser. No. 13/653,398, filed on Oct. 16, 2012, entitled LOGIC MODEL FOR MEDIA CUSTOMIZATION.

BACKGROUND

1. Field

This disclosure generally relates to the field of computing systems. More particularly, the disclosure relates to media customization.

2. General Background

Media systems may generate and/or provide playback of various types of media. Examples of media include video and audio data. Many media systems are static based systems. In other words, a set of media may be generated and unchanged. The user has to then watch and/or listen to a set of media for which the user has no participation. As an example, a user may watch a movie and want to perform a different action than that of an actor in the movie. Currently, the user has to watch the movie based on that statically generated movie and cannot participate in that movie.

SUMMARY

In one aspect of the disclosure, a process is provided. The process receives, with a computing device, a plurality of media files. Further, the process associates, with the computing device, an item with a media file from the plurality of media files according to an association. The item is displayed during display of the media file. The association has a predetermined playback time during playback of the media file at which item data is displayed in addition to the display of the media file. In addition, the process generates, with the computing device, a hierarchical logic model for media playback. The hierarchical logic model organizes the plurality of media files for playback into a hierarchy according to a predetermined set of conditions. The process also provides a set of code to a media player for media playback based upon the logic model and the association between the item and the media file.

In another aspect of the disclosure, a process is provided. The process receives, with a computing device, a plurality of media files. Further, the process associates, with the computing device, a social network topic with a media file from the plurality of media files according to an association. The social network topic is displayed in a social network display during display of the media file. In addition, the process generates, with the computing device, a hierarchical logic model for media playback. The hierarchical logic model organizes the plurality of media files for playback into a hierarchy according to a predetermined set of conditions. Further, the process provides a set of code to a media player for media playback based upon the logic model and the association between the item and the social network topic.

In yet another aspect of the disclosure, a computer program product includes a computer useable medium having a computer readable program. The computer readable program when executed on a computer causes the computer to associate, with the computing device, an item with a media file from the plurality of media files according to an association. The item is displayed during display of the media file. The association has a predetermined playback time during playback of the media file at which item data is displayed in addition to the display of the media file. Further, the computer readable program when executed on the computer causes the computer to generate, with the computing device, a hierarchical logic model for media playback. The hierarchical logic model organizes the plurality of media files for playback into a hierarchy according to a predetermined set of conditions. In addition, the computer readable program when executed on the computer causes the computer to provide a set of code to a media player for media playback based upon the logic model and the association between the item and the media file.

In yet another aspect of the disclosure, a system is provided. The system comprises a server that receives a plurality of media files, associates an item with a media file from the plurality of media files according to an association, generates, with the computing device, a hierarchical logic model for media playback, and provides a set of code to a media player for media playback based upon the logic model and the association between the item and the media file. The item is displayed during display of the media file. The association has a predetermined playback time during playback of the media file at which item data is displayed in addition to the display of the media file. The hierarchical logic model organizes the plurality of media files for playback into a hierarchy according to a predetermined set of conditions.

BRIEF DESCRIPTION OF THE DRAWINGS

The above-mentioned features of the present disclosure will become more apparent with reference to the following description taken in conjunction with the accompanying drawings wherein like reference numerals denote like elements and in which:

FIG. 2A illustrates a system configuration that utilizes the hierarchical logic model module illustrated in FIG. 1 to generate a hierarchical logic model and a hierarchical logic model object.

FIG. 2B illustrates a system configuration that is an alternative to the system configuration illustrated in FIG. 2A.

DETAILED DESCRIPTION

A method, system, apparatus, and computer program product may be utilized to provide a media builder tool that customizes media for a playback in a media player. The media may be video and/or audio. As an example, the media builder tool allows a user to generate a multi-threaded interactive video that allows fans to affect the outcome of the video as the fans watch the video. As a result, the audience becomes an integral part of the story world.

In one embodiment, a hierarchical logic model is utilized to generate the storyline for the media builder tool. The hierarchical logic model is a model that logically organizes a set of received media files into a storyline. The organization of the media files is performed according to a predetermined set of conditions. As an example, the predetermined set of conditions may include a condition for playback of particular media file. For example, a user may have to perform a particular action in a video in order for another video clip to be played. For instance, a user watching the generated movie may be a detective that has to select a door from four possible doors to go through. Each door may result in a particular action within the hierarchical logic model. As examples, a particular video may be played if the user selects a first door whereas a user may be have to perform another action based upon selecting a second door. In other words, the model may be generated based upon a set of media files so that a user may participate in the watching and/or listing to the media and affect the outcome of the playback of the media files. As a result, different users may watch different videos based upon their own individual interactions with the video.

Further, the composer of the media object may share the video with other colleagues, friends, or the like through various communications methods, social media platforms, or the like. For instance, a URL, link, or the like may be sent so that another user may watch and/or listen to the media. The composer of the media object may then track the results of the individual interactions that users had with the media object through their respective media players. In one embodiment, the respective media players send data to the composer of the media object indicating the various results. The composer of the media object may then tally the various results and generate statistics based on the usage. For example, the composer of the media object may calculate the total amount of users that selected each door.

The hierarchical logic model may be utilized for media consumption in various contexts. For example, the hierarchical logic model may be utilized for entertainment, education, or the like.

Figure 1:
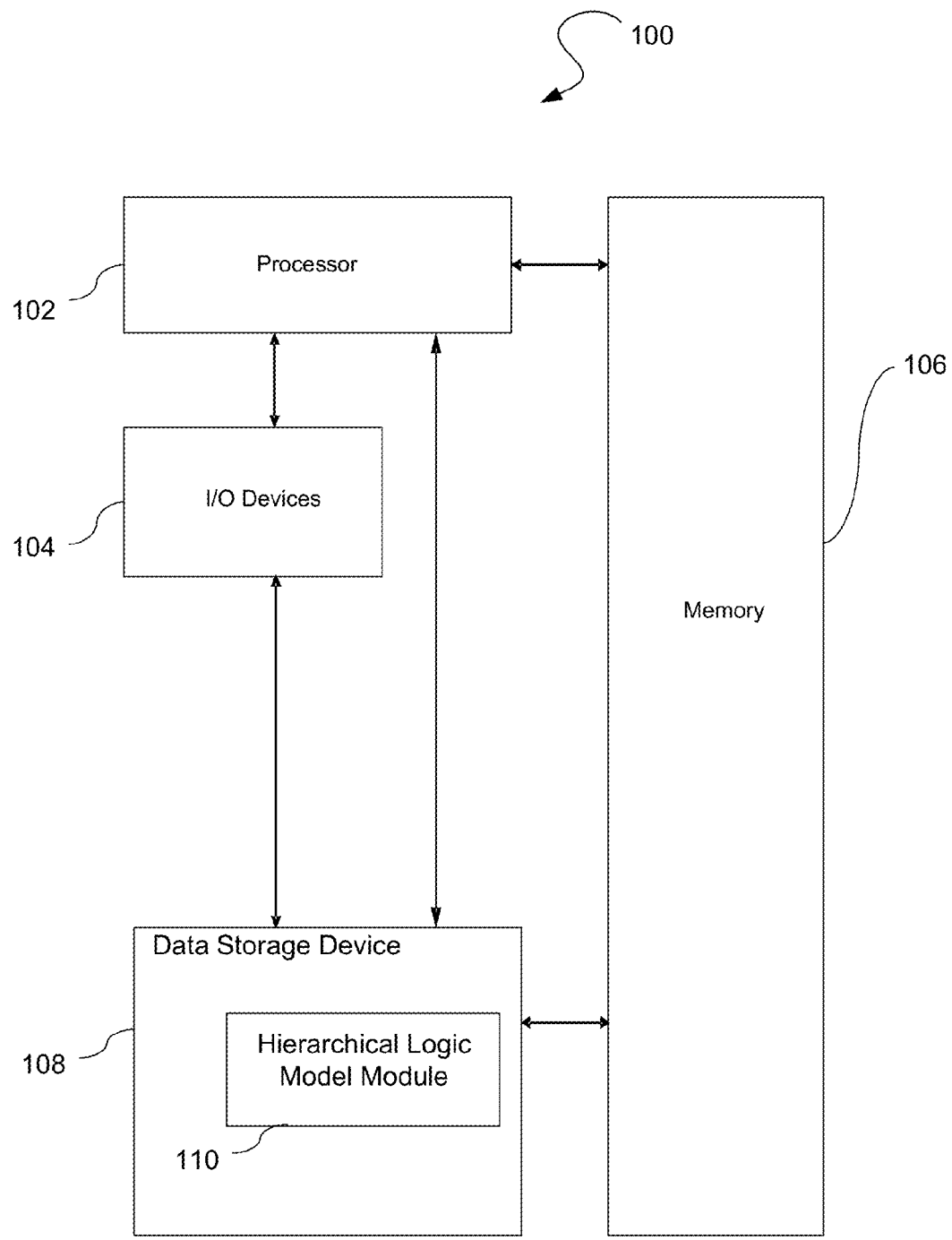
FIG. 1 illustrates a media customization configuration.

FIG. 1 illustrates a media customization configuration 100. In one embodiment, the media customization configuration 100 is implemented utilizing a general purpose computer or any other hardware equivalents. Thus, the media customization configuration 100 comprises a processor 102, and various input/output devices 104, e.g., audio/video outputs and audio/video inputs, storage devices, including but not limited to, a tape drive, a floppy drive, a hard disk drive or a compact disk drive, a receiver, a transmitter, a speaker, a display, an image capturing sensor, e.g., those used in a digital still camera or digital video camera, a clock, an output port, a user input device such as a keyboard, a keypad, a mouse, and the like, or a microphone for capturing speech commands, a memory 106, e.g., random access memory ("RAM") and/or read only memory (ROM), a data storage device 108, and a hierarchical logic model module 110.

The hierarchical logic model module 110 may be implemented may be implemented as a set of computer readable instructions that may be utilized by the processor 102 in the memory 106 to perform various actions to associated with the hierarchical logic model. The hierarchical logic model module 110 may be represented by one or more software applications, where the software is loaded from a storage medium, e.g., a magnetic or optical drive, diskette, or non-volatile memory, and operated by the processor 102 in the memory 106 of the computer. As such, the hierarchical logic model module 110 including associated data structures of the present disclosure may be stored on a computer readable medium, e.g., RAM memory, magnetic or optical drive or diskette and the like. As an example, the hierarchical logic model module 110 may be implemented as an application that is downloaded onto a smartphone or tablet device.

Alternatively, the hierarchical logic model module 110 may be implemented as one or more physical devices that are coupled to the processor 102. The hierarchical logic model module 110 may be utilized to implement any of the configurations herein. For example, the processor 102 may be utilized to generate a hierarchical logic model, receive media files for the hierarchical logic model, organize the media files for the hierarchical logic model, generate a media object based upon the hierarchical logic model, communicate with video players to transmit the media object to the video players, communicate with video players to receive data regarding usage of the media object, analyze the received usage data, generate analytical data for statistical purposes, or the like.

Figure 2A:
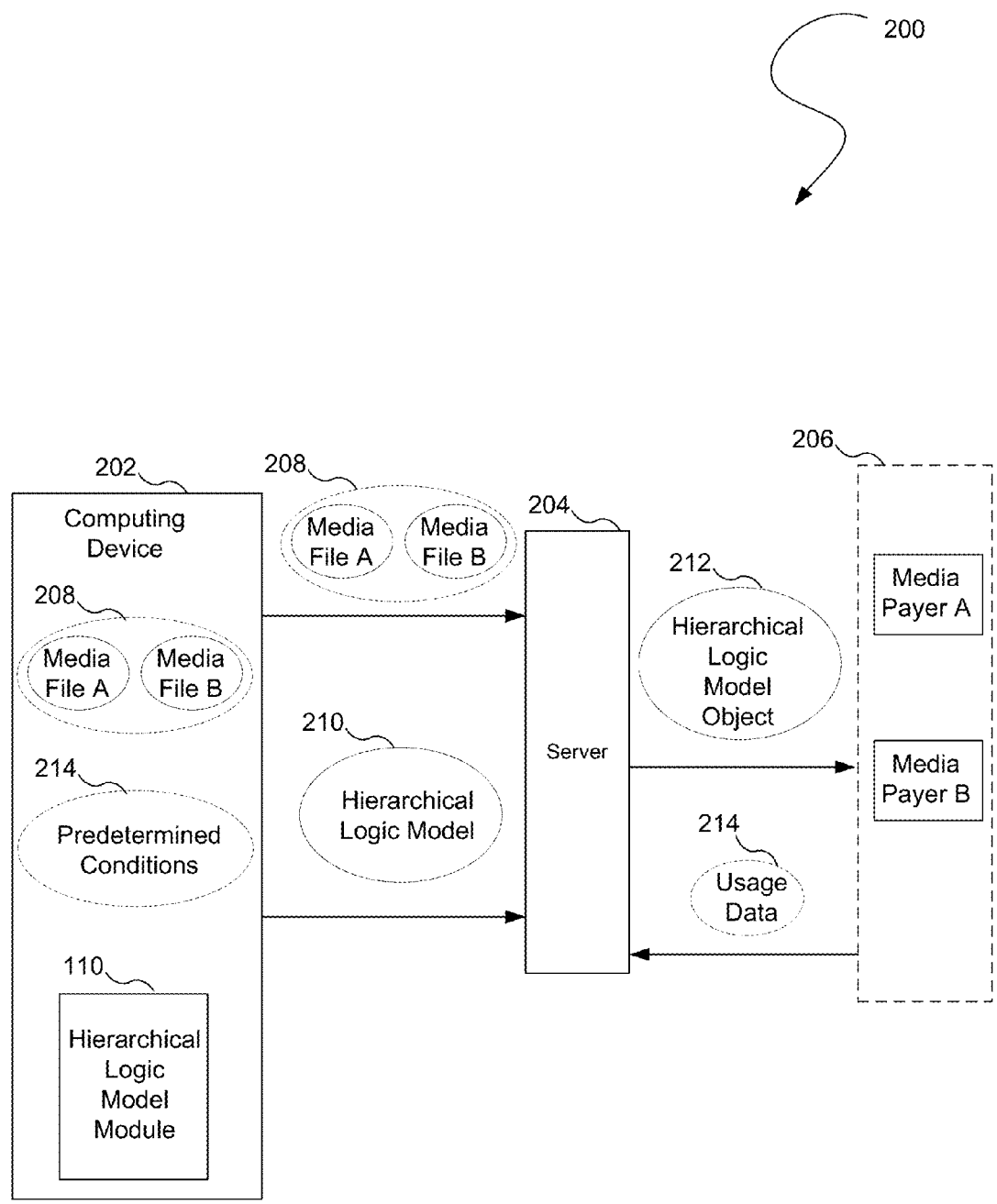
FIG. 2A and FIG. 2B illustrate various system configurations.
Figure 2B:
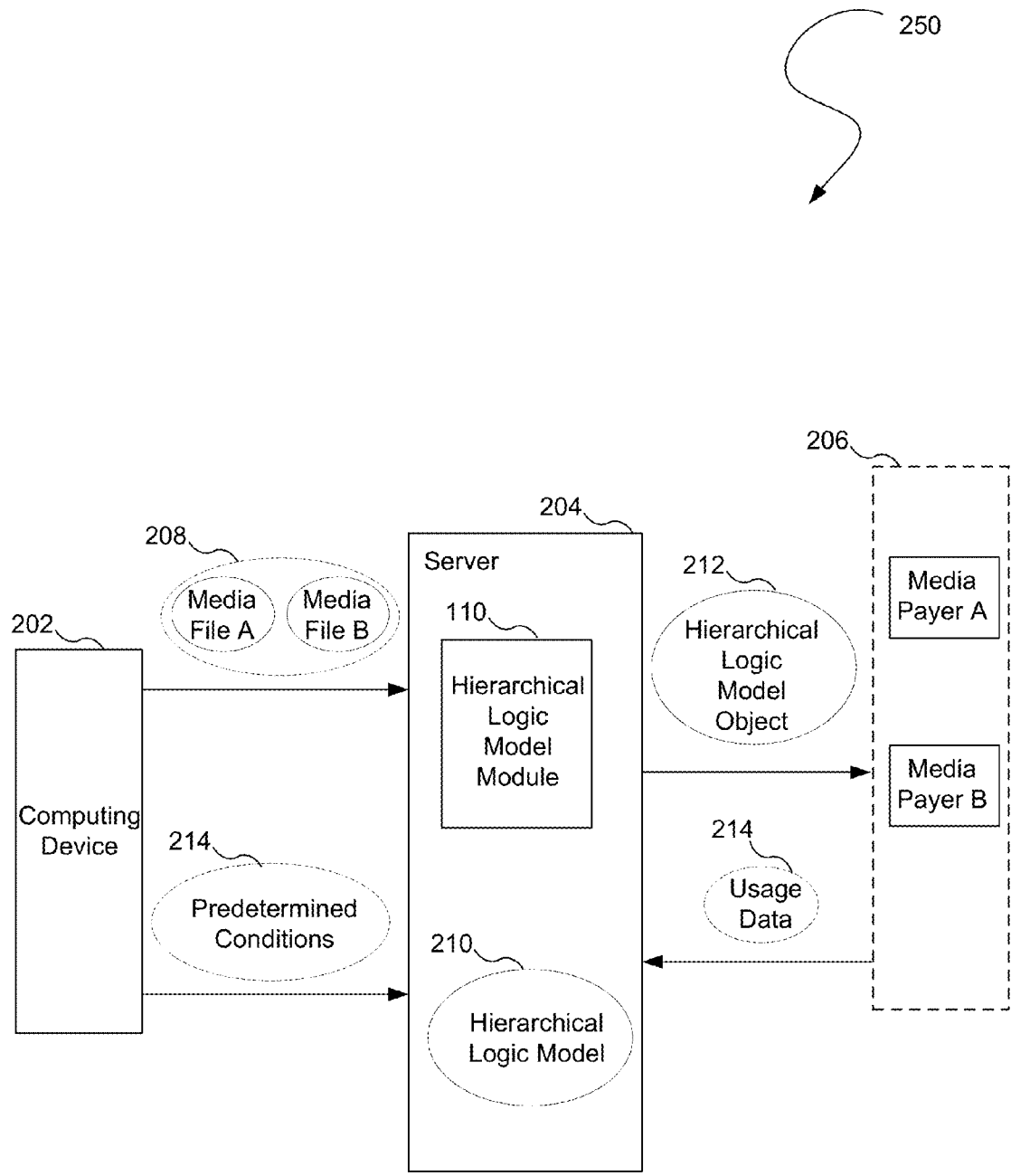

FIG. 2A and FIG. 2B illustrate various system configurations. FIG. 2A illustrates a system configuration 200 that utilizes the hierarchical logic model module illustrated in FIG. 1 to generate a hierarchical logic model 210 and a hierarchical logic model object 212. The system configuration 200 includes a computing device 202, a server 204, and a plurality of media players 206. The computing device 202 may be a personal computer ("PC"), laptop, notebook, smartphone, tablet device, or the like. In one embodiment, the computing device 202 stores the hierarchical logic model module 110. In another embodiment, the computing device 202 receives the hierarchical logic model module 110 from a storage device, another computing device, a streamed download, or the like. The hierarchical logic model module 110 may be a set of code with computer readable instructions for generating a hierarchical logic model. The hierarchical logic model module 110 may generate a hierarchical logic model 210 based upon a set of media files 208 and a set of predetermined conditions 214. As an example, the hierarchical logic model 210 may be a logic tree that includes various nodes. Each node may be representative of a particular condition from the set of predetermined conditions 214. A user may utilize the computing device 202 to generate the hierarchical logic model 210 to customize a storyline based upon the set of media files 208. As an example, various video clips may be positioned at different nodes within the hierarchical logic model to initiate playback of those video clips based upon certain user interactions.

The set of media files 208 may include video files and/or audio files. The set of media files 208 is illustrated as having the media file A and the media file B for ease of illustration. A single media file or more than two media files may alternatively be utilized. The set of media files 208 may be stored on the computing device 202, downloaded from a server or another computing device, streamed from a server or another computing device, transferred from a computer readable storage device, or received through any other communication methodology.

In one embodiment, the computing device 202 generates the hierarchical logic model and provides that hierarchical logic model to the server 204 along with the set of media files 208. The server 204 then generates a hierarchical logic media object 212 based upon the hierarchical logic model and the set of media files 208. In other words, the server 204, bundles the set of code for the hierarchical logic model along with the set of media files 208 into a software object. The server 204 then sends that software object to the plurality of media players 206. Various users may then utilize the plurality of media players to watch and interact with the media according to the hierarchical logic model. In one embodiment, the plurality of media players 206 sends a set of usage data 214 to the server 204. The usage data may include data associated with the particular nodes that were reached by respective users. In other words, the individual paths through the decision tree of the hierarchical logic model may be recorded and sent to the server 204 for statistical and/or analytical purposes. As a result, choices by users at different logic nodes may be analyzed.

The set of media players may include video players, audio players, and/or players that provide both video and audio playback functionality. The set of media players 206 is illustrated as having a media player A and a media player B for ease of illustration. A single media player or more than two media players may alternatively be utilized.

In an alternative embodiment, usage data is not sent from the set of media players 206 to the server 204. The server 204 may send the hierarchical logic media object 212 without receiving any usage data. For example, gathering of statistics and performing analysis on usage data may not be utilized.

FIG. 2B illustrates a system configuration 250 that is an alternative to the system configuration 200 illustrated in FIG. 2A. The hierarchical logic model module 110 is located at the server 204 in the system configuration 250. Further, the server 204 generates the hierarchical logic model based upon the hierarchical logic model module 110. Accordingly, the computing device 202 sends the set of media files 208 and the set of predetermined conditions 214 to the server 204 so that the server 204 generates the hierarchical logic model 210 instead of the computing device 202.

Figure 3:
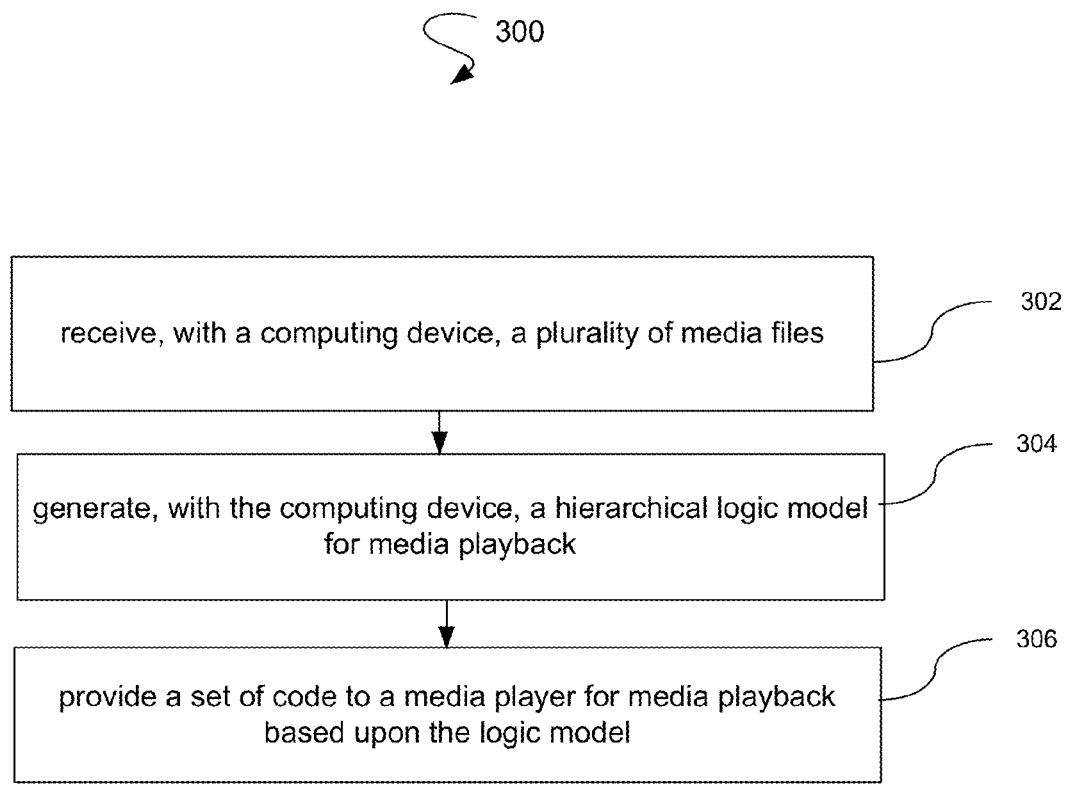
FIG. 3 illustrates a process that is utilized to generate the hierarchical logic model illustrated in FIGS. 2A and 2B.

FIG. 3 illustrates a process 300 that is utilized to generate the hierarchical logic model 210 illustrated in FIGS. 2A and 2B. At a process block 302, the process 300 receives, with a computing device, a plurality of media files. Further, at a process block 304, the process 300 generates, with the computing device, a hierarchical logic model for media playback, the hierarchical logic model organizing the plurality of media files for playback into a hierarchy according to a predetermined set of conditions. In addition, at a process block 306, the process 300 provides a set of code to a media player for media playback based upon the logic model.

The processes described herein may be implemented in a general, multi-purpose or single purpose processor. Such a processor will execute instructions, either at the assembly, compiled or machine-level, to perform the processes. Those instructions can be written by one of ordinary skill in the art following the description of the figures corresponding to the processes and stored or transmitted on a computer readable medium. The instructions may also be created using source code or any other known computer-aided design tool. A computer readable medium may be any medium capable of carrying those instructions and include a CD-ROM, DVD, magnetic or other optical disc, tape, silicon memory, e.g., removable, non-removable, volatile or non-volatile, packetized or non-packetized data through wireline or wireless transmissions locally or remotely through a network. A computer is herein intended to include any device that has a general, multi-purpose or single purpose processor as described above.

Figure 4:
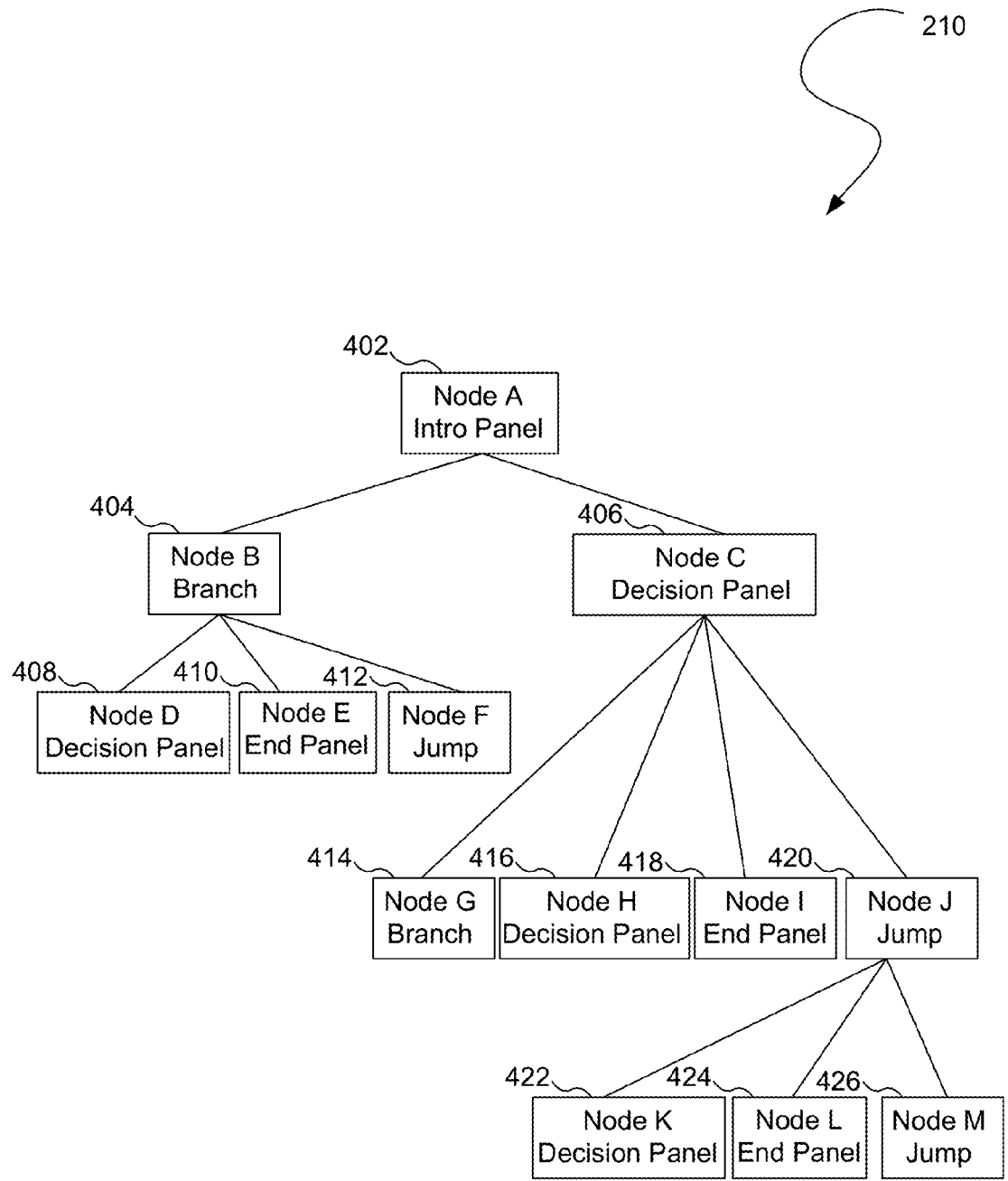
FIG. 4 illustrates an example of the hierarchical logic model illustrated in FIG. 2A.

FIG. 4 illustrates an example of the hierarchical logic model 210 illustrated in FIG. 2A. The hierarchical logic model 210 may include a set of nodes with different properties. As an example, the hierarchical logic model 210 may include an intro panel node, a branch node, a decision panel node, a jump node, and an end panel node. The intro panel node displays an intro media file, text, graphics, and/or the like selected by the user organizing the media. Further, the branch node plays a media file such as a video file or an audio file. Accordingly, a media file that is designated at a particular branch node of the hierarchical logic model 210 will be played if a user watching the media file reaches that particular node in the playback of the media object. In addition, a decision panel node involves a decision by the user watching and/or listening to the media object. Various nodes may be reached based upon the outcome of the decision by the user. For example, a decision panel node may represent a node where a user has to decide which door to go through. Further, a jump node indicates when a playback of the media object is directed to a different node in the hierarchical logic model 210. That different node may or may not be a neighboring node.

Each node may also be restricted according to a set of rules as to which other nodes may be neighboring nodes. For example, the allowable next nodes for an intro panel node may be a branch node and a decision panel node, the allowable next nodes for a branch node may be a decision panel node, an end panel node, and a jump node, the allowable next nodes for a decision panel node may be a branch node, a decision panel node, an end panel node, and a jump node, the allowable next nodes for a jump node may be a decision panel node, and end panel node, and a branch panel node, and no next nodes may be available for an end panel node.

As an example, a node A 402 may be an intro panel. The node A 402 may have next nodes such as a node B 404 and a node C 406. The node B 404 may be a branch node that has next nodes such as a node D 408, a node E 410, and a node F 412. The node D 408 may be a decision panel node, the node E 410 may be an end panel node, and the node F may be a jump node. The node C 406 may be a decision panel that has next nodes such as a node G 414, a node H 416, a node I 418, and a node J 420. The node G 414 may be a branch node, the node H 416 may be a decision panel node, the node I 418 may be an end panel node, and the node J 410 may be a jump node. Further, the node J 420 may have next nodes such as a node K 422, a node L 424, and a node M 426. The node K 422 may be a decision panel node, the node L 424 may be an end panel node, and the node M may be a jump node 426.

The various types of nodes and rules for neighboring nodes are provided only for ease of illustration. Various other types of nodes with different properties and different rule sets may be utilized.

Figure 5:
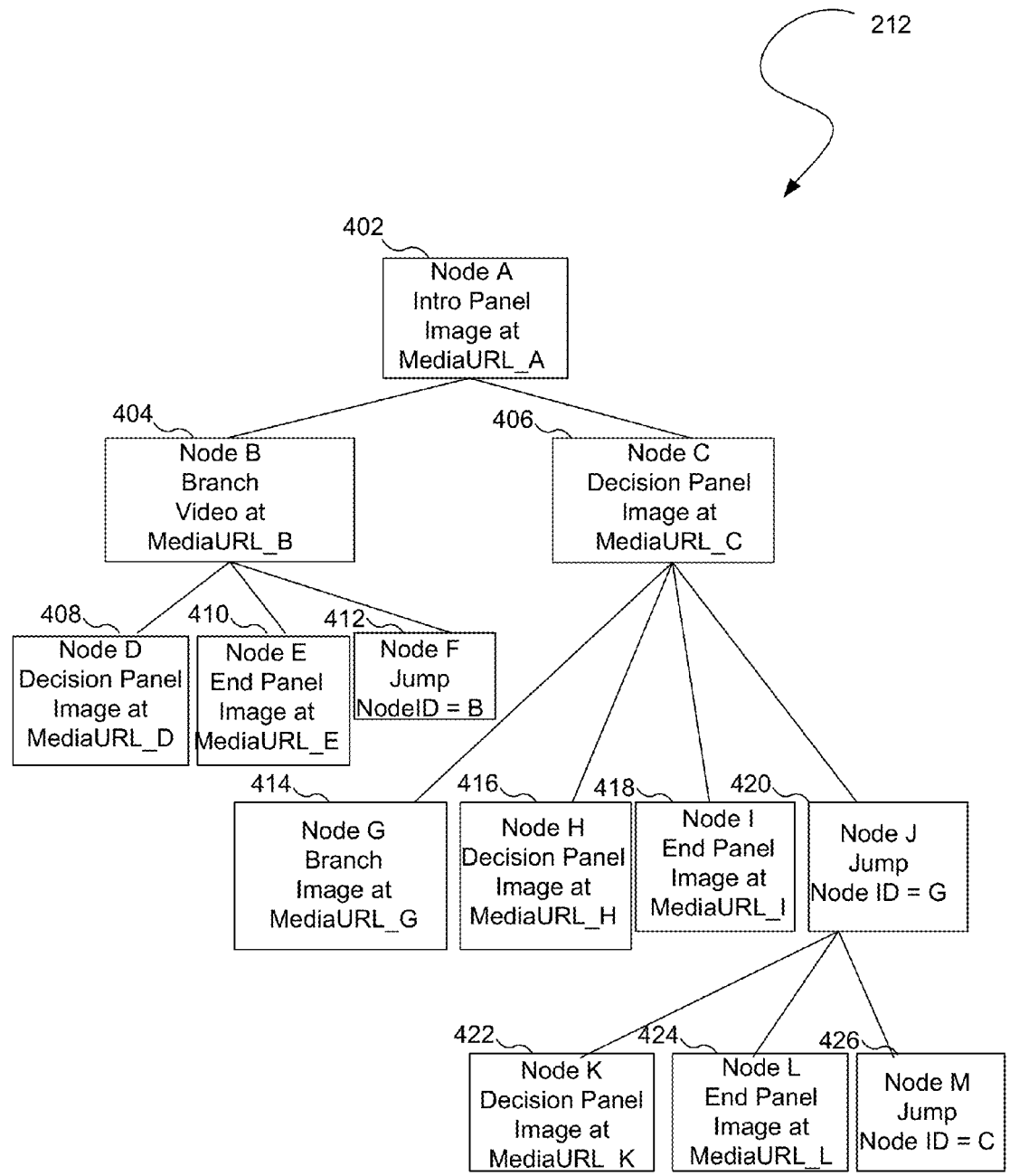
FIG. 5 illustrates an example of the hierarchical logic model object illustrated in FIGS. 2A and 2B that is based upon the hierarchical logic model illustrated in FIG. 4.

FIG. 5 illustrates an example of the hierarchical logic model object 212 illustrated in FIGS. 2A and 2B that is based upon the hierarchical logic model 210 illustrated in FIG. 4. The hierarchical logic model object 212 is the object that results from applying the predetermined conditions and media files to the hierarchical logic model 210 illustrated in FIG. 4. As an example, the node A 402 indicates that the image for the intro panel is located at the MediaURL_A. As other examples, the node B 404 indicates that the video for the branch is located at the Media URL _B and the node G 414 indicates that the video for the branch is located at the Media URL_G. As yet other examples, the node C indicates the predetermined conditions for the decision panel are displayed in an image at MediaURL_C, the node D indicates the predetermined conditions for the decision panel are displayed in an image at MediaURL_D, the node H indicates the predetermined conditions for the decision panel are displayed in an image at MediaURL_H, and the node K indicates the predetermined conditions for the decision panel are displayed in an image at MediaURL_K. The images may provide a display of or auditory cue for user selection. Various examples of possibly ways that a user may select a decision at a decision panel include selecting a particular object, selecting an object at particular coordinates that are highlighted, e.g., through an outline, and selecting at an object at particular coordinates that are not highlighted, e.g., a particular object or area of coordinates that a user knows or guesses is an opportunity to provide a selection. As other examples, the node F has a jump to the node B 404, the node has a jump to the node G 414, and the node M has a jump to the node C 406. As yet other examples, the node E 410 indicates that an image is located at the MediaURL _E for the end panel, the node I 418 indicates that an image is located at the MediaURL_I for the end panel, and the node L indicates that an image is located at MediaURL _L for the end panel. The hierarchical logic model object 212 is then sent to the plurality of media players 206 illustrated in FIGS. 2A and 2B for playback.

Figure 6:
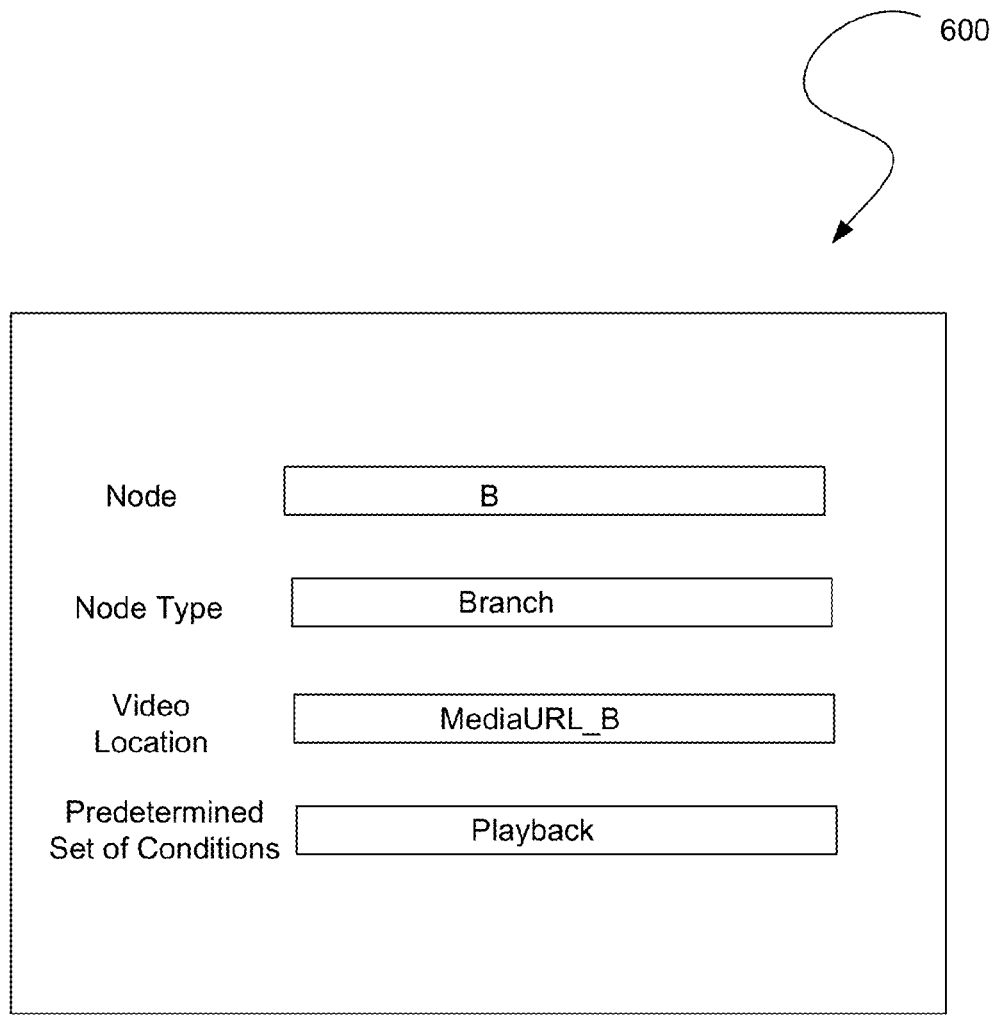
FIG. 6 illustrates an example of a user interface that may be utilized to receive input from the user to generate the hierarchical logic model object based upon the hierarchical logic model.

FIG. 6 illustrates an example of a user interface 600 that may be utilized to receive input from the user to generate the hierarchical logic model object 212 based upon the hierarchical logic model 210. The user interface 600 includes various fields such as a node filed, a node type field, a video location field, and a predetermined set of conditions field. The user provides various inputs for each node so that the hierarchical logic model object 212 may be generated. As an example, a user may provide the inputs so that a processor may automatically generate the hierarchical logic model object 212. Various other fields may be generated based upon the particular type of node. For example, a selection of a jump node may not have any field for a video location or an image location as a display of a video or an image is not necessary for the jump to occur.

Figure 7:
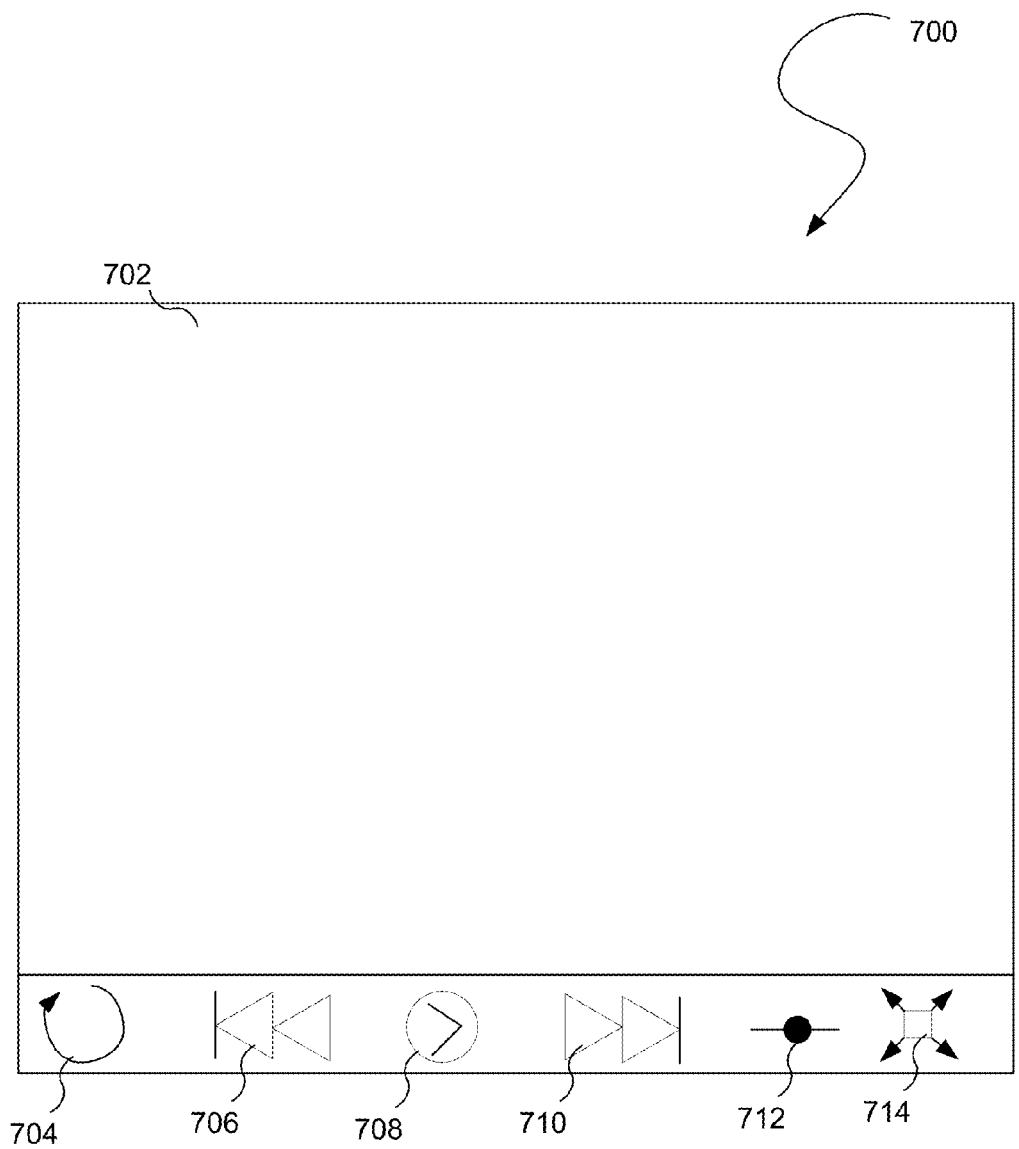
FIG. 7 illustrates an example of a video player.

FIG. 7 illustrates an example of a video player 700. The video player 700 has a replay indicium 702, a previous node indicium 704, a play/pause indicium 706, a next node indicium 708, a volume indicium 710, a volume indicium 712, and a screen size indicium 714. Accordingly, a user that receives the hierarchical logic model object 212 may perform playback operations on the the hierarchical logic model object 212 with these indicia. The video player 700 allows the user to move through previous nodes and next nodes of the hierarchical logic model object 212. In yet another embodiment, a scrubber may be utilized to show the position in the video and allow the user to move to different positions. The illustrated indicia are provided for ease of illustration. Accordingly, other types of indicia may be utilized.

Figure 8:
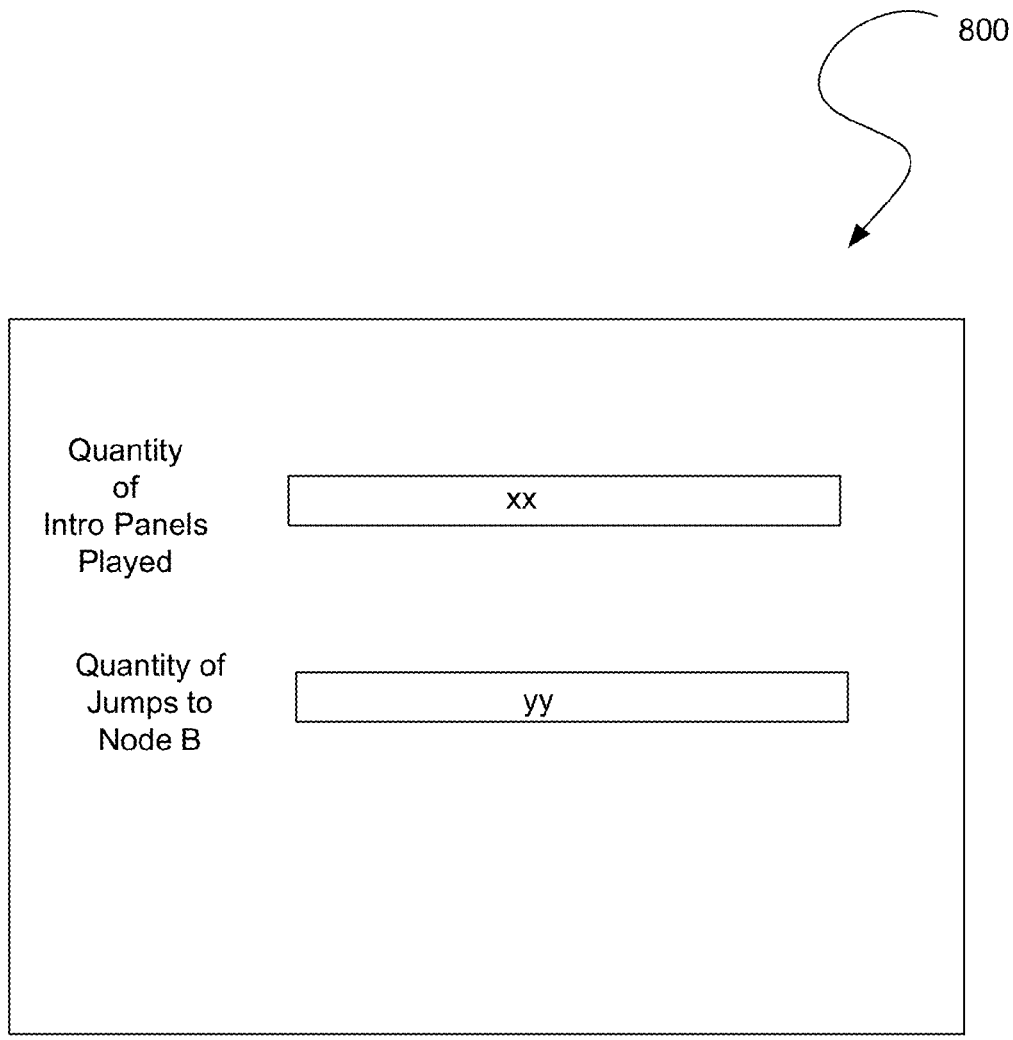
FIG. 8 illustrates a video analytics display.

FIG. 8 illustrates a video analytics display 800. As examples, data such as the quantity of intro panels played and/or the quantity of jump operations performed from the plurality of media players 206 illustrated in FIGS. 2A and 2B may be recorded. These examples are provided for ease of illustration. Various other quantities may be gathered for statistical and/or analytical purposes. Further, other types of analysis may be performed such as determining the particular quantities on a geographical basis. For example, the quantity of intro panels played in a first geographic region and a second geographic region may be determined. In addition, more particular analysis within the hierarchical logic model object 212 may be performed. For example, particular quantities at particular nodes may be recorded. As another example, quantities of particular nodes to which jump operations were performed may be recorded. As yet another example, the quantity of time that a user interfaces with a particular node, branch, or overall experience is recorded. In one embodiment, analytics may be utilized to track consumer behavior.

In addition to the configurations provided for in FIGS. 1-8, an item may be associated with the logic model for media customization. Any of the configurations provided for in FIGS. 1-8 may be utilized in conjunction with the item association.

Figure 9:
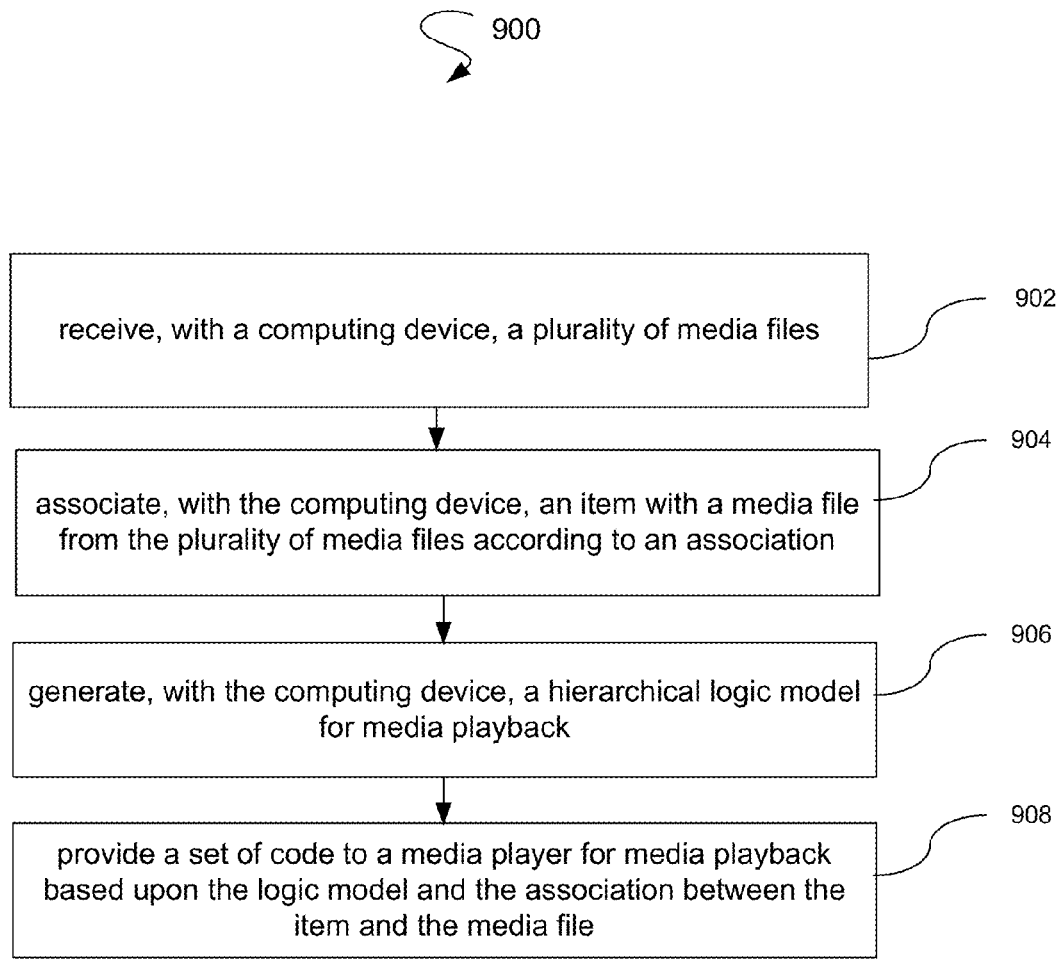
FIG. 9 illustrates a process that may be utilized to provide for item association that is utilized in conjunction with the logic model for media customization.

FIG. 9 illustrates a process 900 that may be utilized to provide for item association that is utilized in conjunction with the logic model for media customization. At a process block 902, the process 900 process receives, with a computing device, a plurality of media files. Further, at a process block 904, the process 900 associates, with the computing device, an item with a media file from the plurality of media files according to an association. The item is displayed during display of the media file. The association has a predetermined playback time during playback of the media file at which item data is displayed in addition to the display of the media file. In addition, at a process block 906, the process 900 generates, with the computing device, a hierarchical logic model for media playback. The hierarchical logic model organizes the plurality of media files for playback into a hierarchy according to a predetermined set of conditions. At a process block 908, the process 900 also provides a set of code to a media player for media playback based upon the logic model and the association between the item and the media file.

Figure 10:
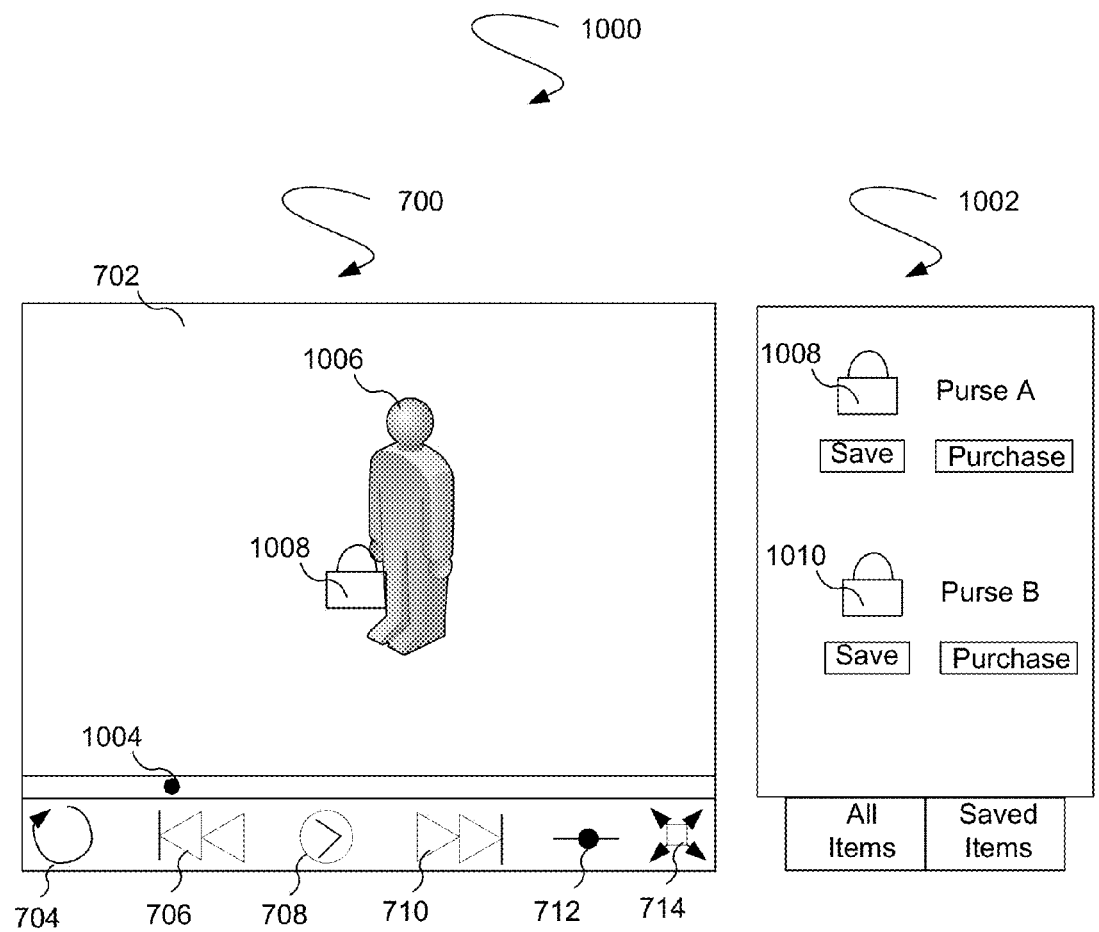
FIG. 10 illustrates a click through configuration.

FIG. 10 illustrates a click through configuration 1000. The click through configuration includes the video player 700 illustrated in FIG. 7 and an item display panel 1002. An author may define an item or a set of items of interest to associate with a video displayed by the video player 700. The click through configuration 1000 also includes a display panel 1002 that may be displayed in proximity or as part of the video player 700. In one embodiment, the item display panel 1002 is synchronized with the media file displayed by the video player 700. For example, the video player 700 may have various times at which respective portions of the video are displayed. A time indicium 1004 is utilized to display a percentage of the video, a particular time, or the like, at which a respective portion of the video is being displayed. For example, an actress 1006 may be carrying an item 1008 such as purse A at the time at which the time indicium 1004 is positioned. An association between the item 1008 and the media file is established so that a set of code displays item data for the item 1008 in the display panel 1002 in synchronization with the time at which the item 1008 is displayed by the video player 700. The term synchronization is intended to include a time before, concurrently with, or after the display of the item 1008 by the video player 700. For example, the set of code may display the item data for the item 1008 according to a predetermined amount of time prior to display of the item 1008 by the video player 700. As another example, the set of code may display the item data for the item 1008 concurrently with the display of the item 1008 by the video player 700. As yet another example, the set of code may display the item data for the item 1008 according to a predetermined amount of time subsequent to display of the item 1008 by the video player 700.

In one embodiment, the item data remains displayed in the display panel 1002 subsequent to the display of the item 1008 within the video player 700 so that a user may interact with the item data. In one embodiment, the item data includes various attributes such as a thumbnail image of the item 1008, descriptive information such as the name of the item 1008, and various inputs such as a save input or a purchase input. The save input allows a user to save the item 1008 to a saved items basket associated with the particular media file played by the video player 700. An all items tab may display item data for all of the items displayed by the video player 700 whereas a saved items tab may display item data for the saved items basket. Further, the purchase input may be a link that is associated with a website at which the item 1008 may be purchased.

In one embodiment, item data for the most recently displayed items by the video player 700 are displayed toward the top of the display panel 1002. For example, item data for the item 1008 is displayed toward the top of the display panel 1002 as the item 1008 was most recently displayed by the video player 700 whereas the item data 1010 is displayed beneath the item data for the item 1008 as the item 1010 may have been previously displayed by the video player 700. Alternative orders of displayed may be utilized. Accordingly, users can click through to view or purchase an item by clicking various inputs in the display panel 1002.

The item display panel 1002 allows for e-commerce integration. Accordingly, users may be able to follow a link or links to purchase various items. Other types of e-commerce integration may be utilized. For example, the users may be able to purchase items directly at the item display panel 1002 rather than following links to other websites. Further, additional information may be provided in the item display panel 1002 about the items other than purchase information, e.g., product and/or service descriptive information.

Figure 11:
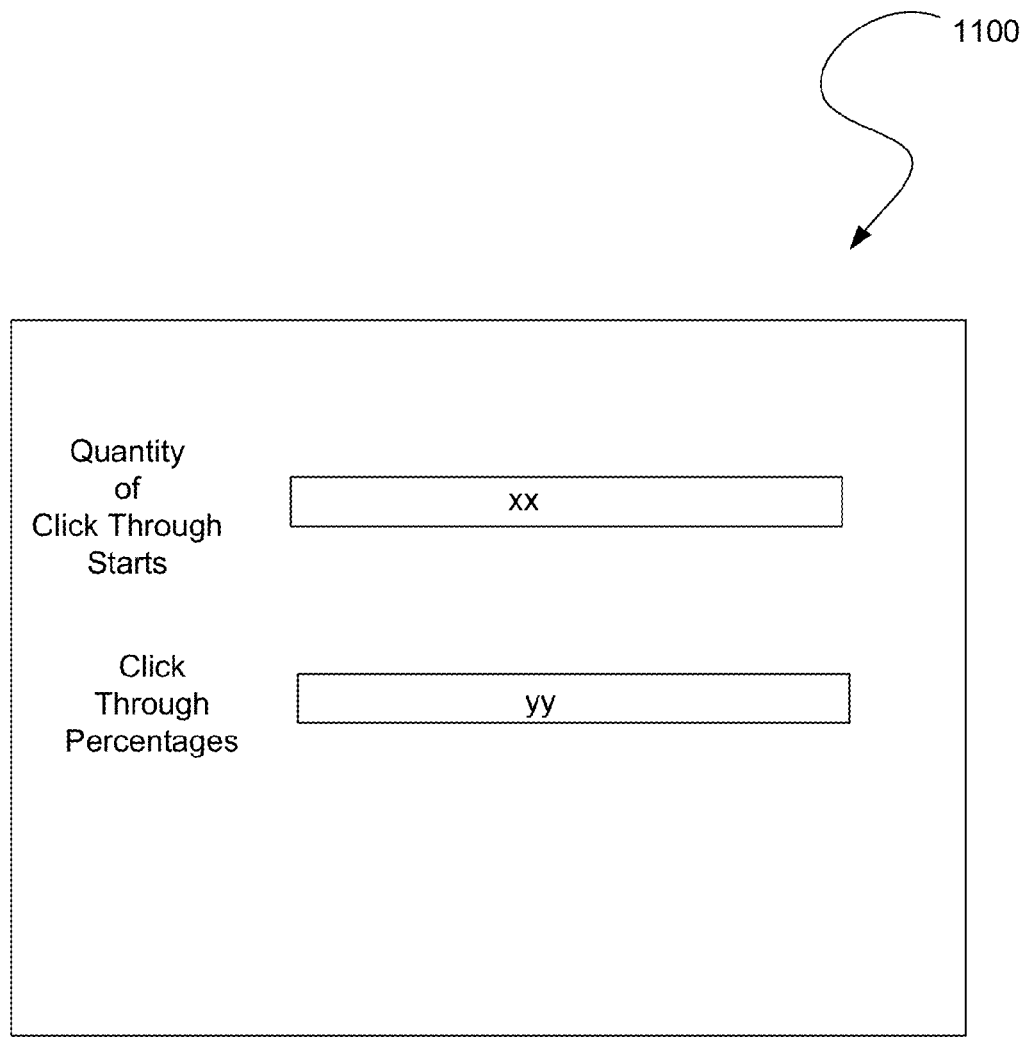
FIG. 11 illustrates a click through analytics display.

FIG. 11 illustrates a click through analytics display 1100. Various user interactions may be tracked. As examples, data such as the quantity of click through starts and click through percentages may be tracked and recorded to determine when users follow the links associated with items for possible purchases. Other data such as impressions, i.e., when the items are displayed to users, and saves, i.e., when the users save to the saved items baskets, may be tracked and recorded.

Figure 12:
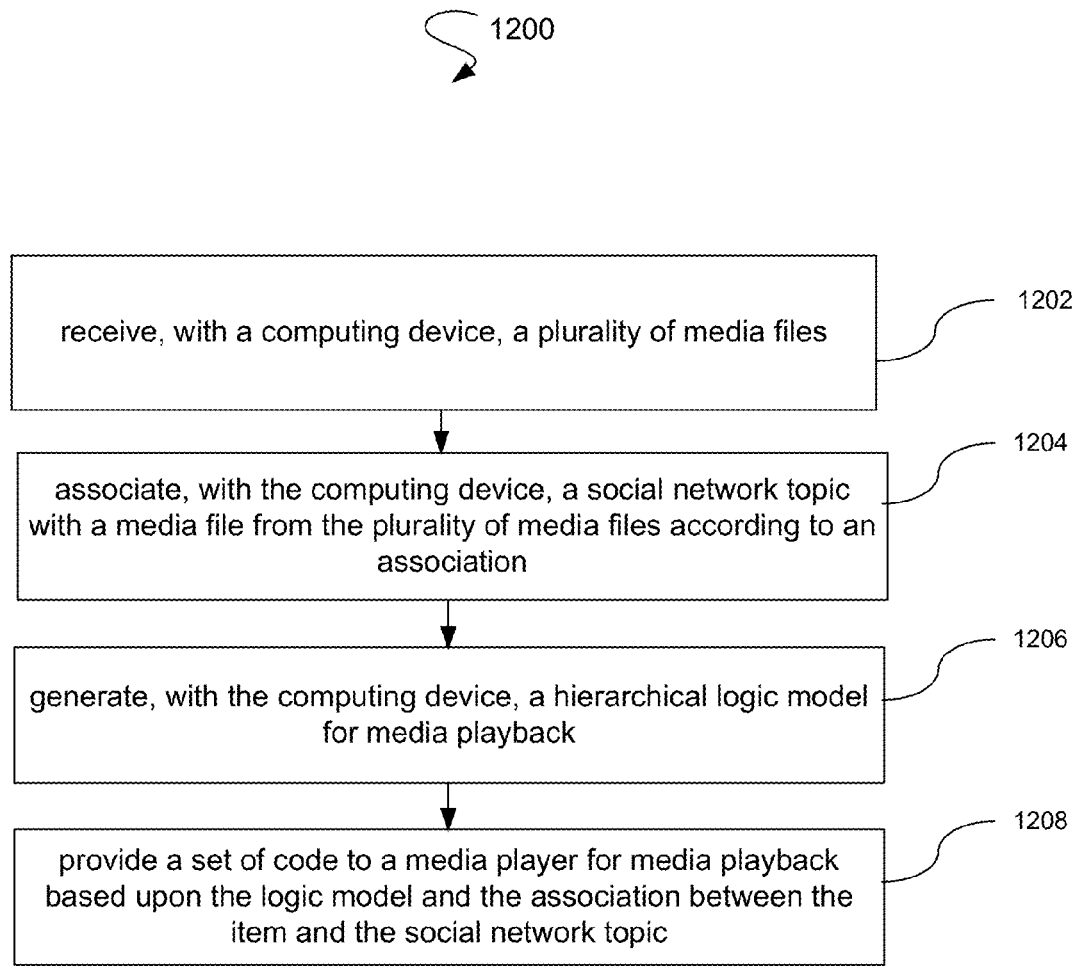
FIG. 12 illustrates a process that may be utilized to provide social network integration with the logic model for media customization.

FIG. 12 illustrates a process 1200 that may be utilized to provide social network integration with the logic model for media customization. At a process block 1202, the process 1200 receives, with a computing device, a plurality of media files. Further, at a process block 1204, the process 1200 associates, with the computing device, a social network topic with a media file from the plurality of media files according to an association. The social network topic is displayed in a social network display during display of the media file. In addition, at a process block 1206, the process 1200 generates, with the computing device, a hierarchical logic model for media playback. The hierarchical logic model organizes the plurality of media files for playback into a hierarchy according to a predetermined set of conditions. Further, at a process block 1208, the process 1200 provides a set of code to a media player for media playback based upon the logic model and the association between the item and the social network topic.

Figure 13:
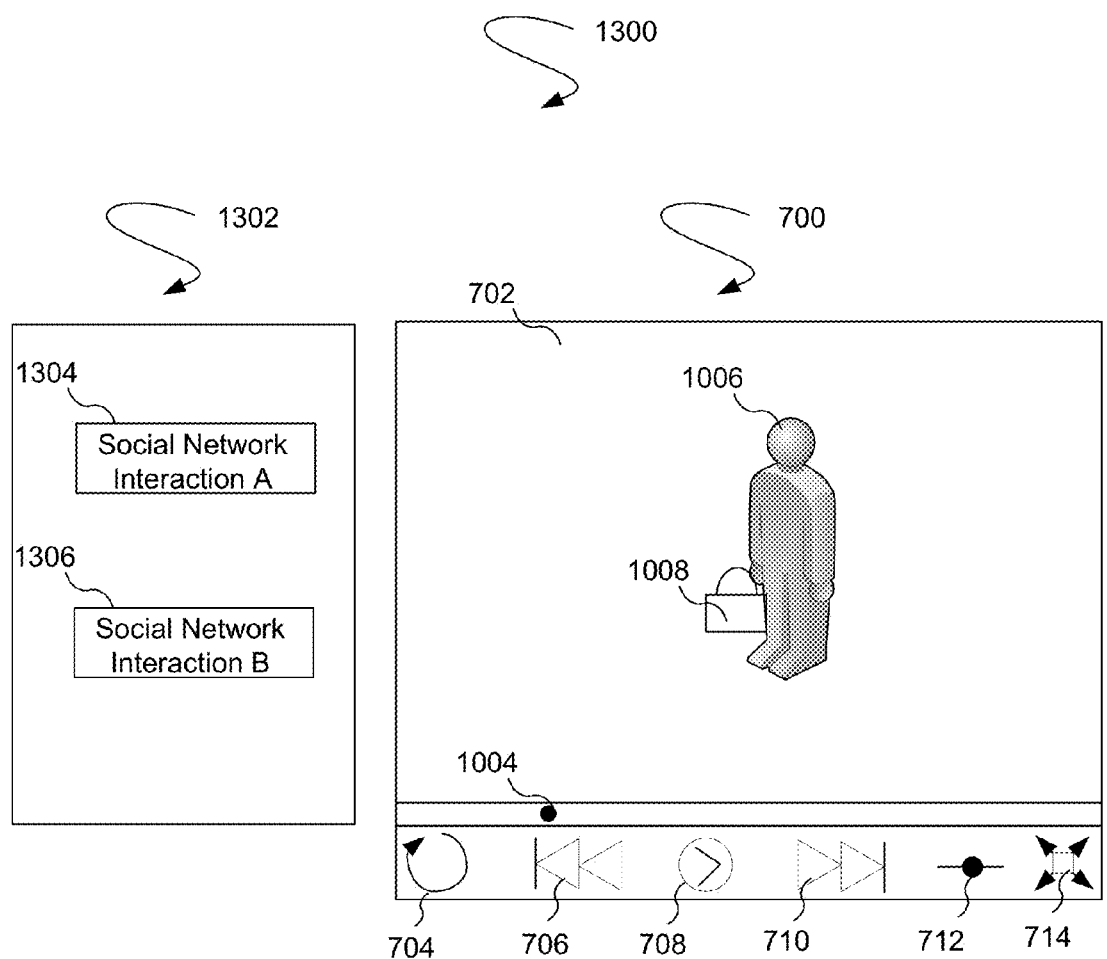
FIG. 13 illustrates a social networking integration configuration.

FIG. 13 illustrates a social networking integration configuration 1300. The social networking integration configuration includes the video player 700 illustrated in FIG. 7 and a social networking display panel 1302. Particular social network topics may be associated with a given video. For example, the social networking display panel 1302 may display a social network interaction A 1304 and a social network interaction B 1306. The social network interactions may be interactions between various users about the video, e.g., an item such as the item 1008. The social networking display panel 1302 may be in proximity to or part of the video player 700. Further, the social networking display panel 1302 may include social network interactions from various different social networks. Alternatively, different social networking display panels may be utilized for different social networks.

In an alternative embodiment, the click through configuration 1000 illustrated in FIG. 10 may be utilized in conjunction with the social networking integration configuration 1300 illustrated in FIG. 13. Accordingly, the item display panel 1002 illustrated in FIG. 10 and the social networking display panel 1302 displayed in FIG. 13 may be utilized in conjunction with the video player 700. Further, the click through configuration 1000 and/or the social networking configuration 1300 may be utilized with any of the other configurations described in FIGS. 1-8.

Although an item is illustrated or described, the configurations provided for may be utilized with multiple items. Further, an item may be a product and/or or a service. It is understood that the processes, systems, apparatuses, and compute program products described herein may also be applied in other types of processes, systems, apparatuses, and compute program products. Those skilled in the art will appreciate that the various adaptations and modifications of the embodiments of the processes, systems, apparatuses, and compute program products described herein may be configured without departing from the scope and spirit of the present processes and systems. Therefore, it is to be understood that, within the scope of the appended claims, the present processes, systems, apparatuses, and compute program products may be practiced other than as specifically described herein.

We claim:

1. A method comprising:
    receiving, with a computing device, a plurality of media files;
    associating, with the computing device, an item with a media file from the plurality of media files according to an association, the item being displayed during display of the media file, the association having a predetermined playback time during playback of the media file at which item data is displayed in addition to the display of the media file;
    generating, with the computing device, a hierarchical logic model for media playback, the hierarchical logic model organizing the plurality of media files for playback into a hierarchy according to a predetermined set of conditions; and
    providing a set of code to a media player for media playback based upon the logic model and the association between the item and the media file.

2. The method of claim 1, wherein the set of code synchronizes playback of the media file with display of the item data at the predetermined playback time.

3. The method of claim 1, wherein the set of code displays the media file in a media player display and displays the item data in a panel that is within proximity to the media player display.

4. The method of claim 3, wherein the set of code displays the item data as a thumbnail image of the item in the panel.

5. The method of claim 3, wherein the set of code displays the item data as descriptive information about the product in the panel.

6. The method of claim 3, wherein the set of code displays the item data as a link in the panel.

7. The method of claim 4, wherein the link is a Uniform Resource Locator associated with a website at which the item is available for purchase.

8. The method of claim 3, wherein the set of code displays additional item data for additional items as the additional items are displayed in the media file.

9. The method of claim 3, wherein item selections are received through inputs and stored in a basket associated with the media file.

10. The method of claim 1, wherein the item is a product.

11. The method of claim 1, wherein the item is a service.

12. The method of claim 1, wherein the set of code tracks a user interaction of during which the item data is displayed to a user.

13. The method of claim 1, wherein the set of code tracks a user interaction of during which the item data is stored to a basket associated with the media file.

14. The method of claim 1, wherein the set of code tracks a user interaction during which a user follows a link associated with a website at which the item is available for purchase.

15. A method comprising:
  receiving, with a computing device, a plurality of media files;
  associating, with the computing device, a social network topic with a media file from the plurality of media files according to an association, the social network topic being displayed in a social network display during display of the media file;
  generating, with the computing device, a hierarchical logic model for media playback, the hierarchical logic model organizing the plurality of media files for playback into a hierarchy according to a predetermined set of conditions; and
  providing a set of code to a media player for media playback based upon the logic model and the association between the item and the social network topic.

16. The method of claim 15, wherein the set of code displays the media file in a media player display and displays the social network display in a panel that is within proximity to the media player display.

17. The method of claim 15, wherein the social network topic is associated with an item that is displayed during playback of the media file.

18. The method of claim 15, wherein additional social network topics corresponding to additional social networks are displayed in additional social network displays.

19. A system comprising:
  a server that receives a plurality of media files, associates an item with a media file from the plurality of media files according to an association, generates, with the computing device, a hierarchical logic model for media playback, and provides a set of code to a media player for media playback based upon the logic model and the association between the item and the media file, the item being displayed during display of the media file, the association having a predetermined playback time during playback of the media file at which item data is displayed in addition to the display of the media file, the hierarchical logic model organizing the plurality of media files for playback into a hierarchy according to a predetermined set of conditions.

\* \* \* \* \*